United States Patent [19]

Girrell

[11] 4,208,224
[45] Jun. 17, 1980

[54] HEAT TREATMENT PROCESSES UTILIZING H₂O ADDITIONS

[75] Inventor: Carol A. Girrell, Milford, N.J.

[73] Assignee: Airco, Inc., Montvale, N.J.

[21] Appl. No.: 963,244

[22] Filed: Nov. 22, 1978

[51] Int. Cl.² .............................................. C21D 1/48
[52] U.S. Cl. .................................. 148/16.5; 148/16.6; 148/20.3
[58] Field of Search ................... 148/16.5, 16.6, 16.7, 148/20.3, 144

[56] References Cited

U.S. PATENT DOCUMENTS

| 2,085,597 | 6/1937 | Marshall | 148/16.7 |
| 4,049,473 | 9/1977 | Davis et al. | 148/16.5 |
| 4,108,693 | 8/1978 | L'Hermite et al. | 148/16.5 |

FOREIGN PATENT DOCUMENTS 1471880  4/1977  United Kingdom .

Primary Examiner—L. Dewayne Rutledge
Assistant Examiner—John P. Sheehan
Attorney, Agent, or Firm—David L. Rae; Larry R. Cassett; Edmund W. Bopp

[57] ABSTRACT

In a process for carburizing ferrous parts, nitrogen gas is supplied to the vestibule of an integral quench furnace while a gaseous carbon source is supplied without a carrier gas to the furnace hot zone. H₂O is introduced into the hot zone at the rate of 0.1–15 ml/min such that upon vaporization thereof a furnace hot zone atmosphere is formed which includes up to about 40% nitrogen, at least 14% CO and 40% H₂. Subsequent to carburizing, parts may be annealed or bright hardened in the same furnace by increasing the H₂O flow rate to the hot zone to establish an atmosphere comprised of at least 60% H₂.

10 Claims, 1 Drawing Figure

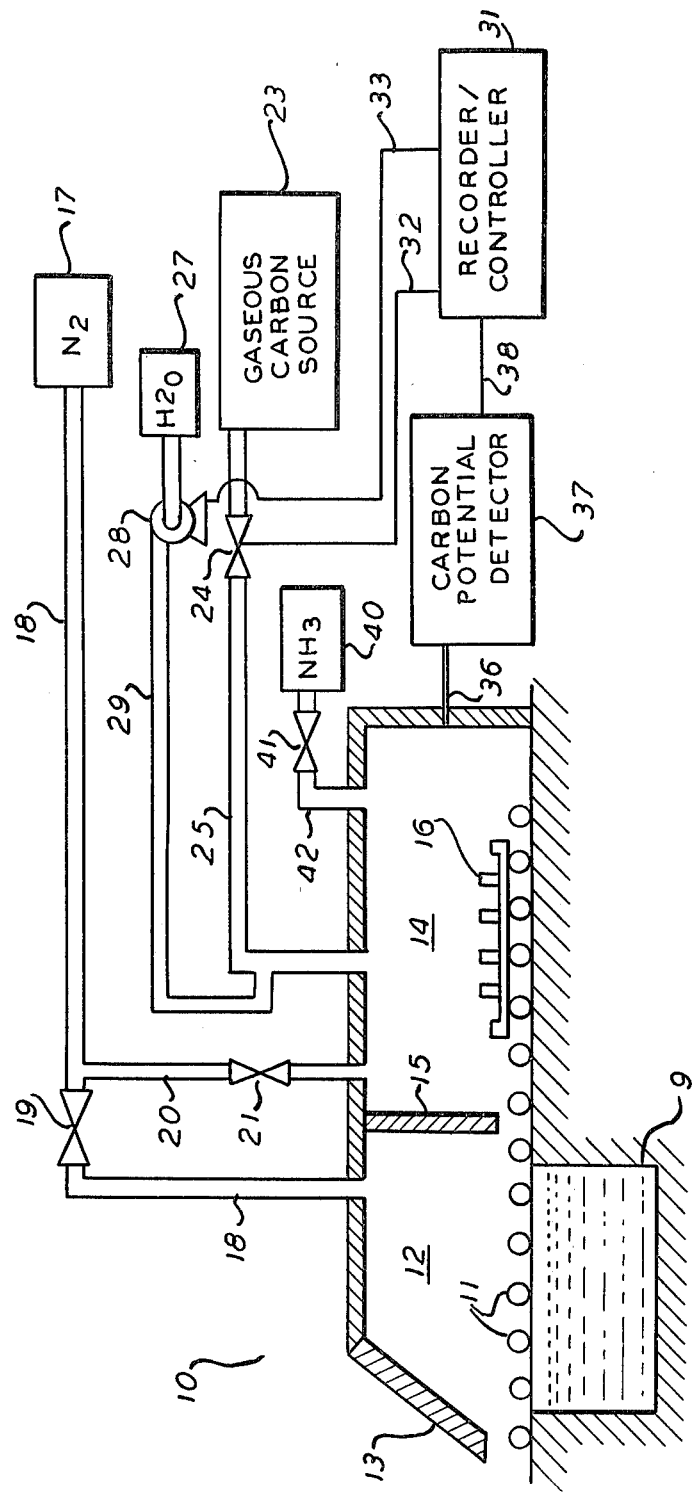

HEAT TREATMENT PROCESSES UTILIZING H₂O ADDITIONS

BACKGROUND OF THE INVENTION

The present invention relates to methods for heat treating ferrous parts and more particularly, to improved processes for carburizing and/or bright hardening or annealing such parts in integral quench or vestibule furnaces.

Heat treatment of ferrous parts for the purpose of improving the metallurgical characteristics thereof has been practiced for many years. It is well known to carburize, bright harden and anneal such parts in various types of furnaces to which an appropriate atmosphere is supplied and maintained under particular temperatures. With respect to the carburization of ferrous parts, it has been common practice to supply an atmosphere comprised of "endothermic" gas (40% hydrogen, 40% nitrogen and approximately 20% carbon monoxide with minor or trace amounts of carbon dioxide and water vapor) to the furnace hot zone together with an enriching flow of natural gas or methane. In vestibule type furnaces, the endothermic gas provides an atmosphere which together with the "spike" of enriching natural gas enables carburization of steel parts and by virtue of utilizing relatively high flow rates of endothermic gas, e.g. 300–400 SCFH, a flow of endothermic gas from the hot zone to a vestibule will maintain the vestibule in a condition which permits the safe carburization of ferrous parts.

Endothermic gas is produced by reacting natural gas with air under controlled conditions in a generator. As a consequence of the sharp increase in the cost of natural gas in recent years, the cost of carburizing with atmospheres comprised of endothermic gas has also substantially increased. Consequently, techniques for avoiding the use of carburizing atmospheres based on hydrocarbon sources have been sought. Alternate atmospheres, however, must permit operation of carburizing and other heat treating furnaces in a safe manner and at the same time must be effective in performing the desired heat treatment function, e.g. carburizing, bright hardening, etc.

It has been proposed to substitute an inert gas such as nitrogen for endothermic gas and add methane and an oxidant such as carbon dioxide or air to the nitrogen carrier gas, which mixture is introduced into the hot zone of a carburizing furnace. Such a process is described in British patent specification No. 1,471,880 which indicates that the constituents of the carrier gas mixture are selected so as to establish a carbon monoxide level between 3.9 and 10.7% in the hot zone. This reference states that various substances such as gaseous oxygen, carbon monoxide, carbon dioxide, water vapor, and mixtures thereof may be utilized as an oxidant. Carbon dioxide is clearly preferred as this reference indicates that $CO_2$ enables appropriate surface carbon concentrations to be obtained with a high nitrogen dilution of the carburizing atmosphere. However, by so utilizing nitrogen-rich carrier gas flows, the reactions occurring in the furnace hot zone become relatively sluggish due to the presence of this large volume of inert gas which absorbs heat and slows reaction kinetics favorable to carburization of ferrous parts. Consequently, a relatively high flow of oxidants (as indicated in Table II of this reference) is required to develop reaction kinetics which will enable carburization at temperatures of approximately 1700° F. Consequently, relatively large flows of hydrocarbon ($CH_4$) are also required to overcome this oxidant and prevent decarburization. In addition, the use of a nitrogen carrier gas in carburizing processes also tends to reduce carbon monoxide and hydrogen levels of the furnace atmosphere substantially below those levels typically provided by use of endothermic gas, namely 15-20% CO and 40% $H_2$. With the resulting low concentrations of CO, namely 3.9–10.7% as taught by this British specification, the reactions which permit and best facilitate carburization simply do not occur to the extent desired. Also, low hydrogen levels decrease the capacity of the furnace atmosphere to produce bright surfaces.

In order to avoid the aforementioned disadvantages of utilizing carrier gas based carburizing atmospheres, it has been proposed in U.S. Pat. No. 4,049,473, which is assigned to the assignee of the present invention, to introduce an inert gas into a furnace vestibule and to supply a gaseous carbon source without a carrier gas to the hot zone of the furnace. By so inerting the furnace vestible, carburization may safely proceed in the hot zone. The inevitable leakage of air into the furnace hot zone will generally supply adequate oxidant to enable desired carburizing reactions to proceed. However, it has been found, particularly with extended carburizing cycles, e.g. 8.0 hours or so, that nitrogen introduced into the vestibule will diffuse into the hot zone and will tend to inhibit reaction kinetics therein. Consequently, it has been found that the carburizing atmosphere may exhibit relatively low carbon monoxide levels, e.g. 7–12% and the desired reaction kinetics are not always achieved. It has been proposed to introduce a controlled flow of air into a furnace hot zone to provide predetermined oxidant supply; however, as air is comprised of 79% nitrogen, this approach has not proven particularly successful when natural gas is relied upon as the gaseous carbon source. One consequence of utilizing a "sluggish" atmosphere in the hot zone of a carburizing furnace is that unreacted methane will exist therein and direct reading control equipment will indicate that a relatively high carbon potential exists in the furnace. However, the unreacted methane is not contributing to carbon added to the ferrous parts or workpieces and thus, difficulty in obtaining desired carbon levels in the workpieces is encountered. Although it is known to utilize carbon dioxide as an oxidant, it is believed that $CO_2$ tends to remove carbon from the parts undergoing treatment, i.e. decarburize such parts, before reacting with free carbon in the atmosphere to generate carbon monoxide. Consequently, additions of carbon dioxide to a carburizing furnace hot zone are not considered to be effective solutions to the problems of safely maintaining desired, reactive carburizing atmospheres.

OBJECTS OF THE INVENTION

It is an object of the present invention to provide improved methods for safely and effectively heat treating ferrous parts.

It is another object of the present invention to provide improved methods for carburizing ferrous parts with atmospheres which require substantially lower hydrocarbon consumption than heretofore have been utilized with endothermic based carburizing processes.

It is a further object of the present invention to provide improved carburizing atmospheres.

It is yet another object of the present invention to provide improved methods for enabling ferrous parts to be carburized and bright hardened (or annealed) in a single integral quench or vestibule type furnace.

It is still another object of the present invention to provide improved methods for carburizing ferrous parts which are not restricted to the use of any particular type of carbon potential control equipment.

It is still a further object of the present invention to provide methods for forming brighter, cleaner surfaces on carburized ferrous parts.

Other objects of the present invention will become apparent from the detailed description of an exemplary embodiment thereof which follows and the novel features of the present invention will be particularly pointed out in conjunction with the claims appended hereto.

SUMMARY

In accordance with the present invention, improved carburization of ferrous parts and the ability to bright harden (or anneal) such parts in the same integral quench/vestibule furnace is achieved by the steps of reducing the furnace dewpoint during heating while passing an inert gas flow to the furnace vestibule, introducing water at the rate of approximately 0.1–15 ml per minute and a gaseous carbon source without a carrier gas to the hot zone to thereby establish an atmosphere containing at least 14% carbon monoxide and 40% hydrogen, which is effective to carburize ferrous parts at conventional temperatures and within acceptable time periods. It has been found that relatively small additions of water, which may be mixed with the flow of a gaseous carbon source such as natural gas, to the hot zone will dramatically increase the carburizing ability of the furnace atmosphere without the use of a carrier gas and without rendering the atmosphere decarburizing. Thus, in accordance with the invention, the addition of the water flows to the furnace hot zone encourages those reactions favorable to carburizing without forming excessive free carbon or soot and produces relatively cleaner carburized parts. Furthermore, in a single vestibule or integral quench furnace, ferrous parts may also be bright hardened (or annealed) by reducing or maintaining temperature and controlling gaseous carbon source flow at the conclusion of a carburizing period and increasing the water flow by approximately 20% to 100% to thereby raise the hydrogen concentration of the atmosphere to approximately 60% or greater. This atmosphere is not rendered decarburizing but is slightly reducing and enables clean, carburized and bright hardened (or annealed) parts to be obtained without sacrificing desirable metallurgical characteristics of such parts i.e. case depth, hardness, etc. Accordingly, by utilization of water additions to the furnace hot zone, carrier gases such as endothermic gas which are expensive and wasteful, and nitrogen which slows carburizing reaction kinetics, are avoided, yet safety is achieved by maintaining a nitrogen flow to the furnace vestibule. Thus, a plurality of heat treating operations can now be performed in a single vestibule type furnace by simple adjustments to furnace temperature, gaseous carbon source flow rates and water flows.

BRIEF DESCRIPTION OF THE DRAWING

The invention will be more clearly understood by reference to the following description of exemplary embodiments thereof in conjunction with the following drawing in which the sole FIGURE is a diagrammatic view of apparatus for heat treating ferrous parts in accordance with the present invention.

DESCRIPTION OF PREFERRED EMBODIMENT

In order to facilitate a full understanding of the present invention, an exemplary embodiment of apparatus in which the process according to the invention may be practiced will now be described in reference to the drawing. Furnace 10 is essentially comprised of vestibule 12 and hot zone 14. Rollers 11 or other means may be utilized to enable passage of a tray (container) or workpieces 16 into hot zone 14. Although doors 13 and 15 between the vestibule and ambient and the vestibule and hot zone 14, respectively, are illustrated, a door may also be provided at the right side of hot zone 14 thereby enabling the introduction of workpieces directly into this zone. Furnace 10 may be provided with an oil bath 9 in which ferrous parts carburized in hot zone 14 may be rapidly quenched. Typically, such an oil bath 9 will be disposed below vestibule 12. A source of inert gas 17, which may comprise nitrogen, is connected through conduits 18 and valve 19 selectively to vestibule 12 of furnace 10 and selectively through conduits 18, 20 and valve 21 to hot zone 14. A carbonaceous gas is supplied from source 23 through valve 24 and conduit 25 into hot zone 14. Also, water is also supplied to hot zone 14 by passage from source 27 through pump 28 and conduit 29 which joins conduit 25 preferably exteriorly of hot zone 14. It will be understood, however, that water may be directly supplied into hot zone 14 as opposed to being premixed with a gaseous carbon source such as natural gas, methane, propane, butane, alcohol or a vaporizable liquid hydrocarbon. Preferably, valve 24 is a solenoid valve which is coupled through electrical line 32 to a recorder-controller device 31. Pump 28 is preferably connected via electrical line 32 to a pulse timer (not shown) which sets the "on-off" ratio of pump 28 under the control of recorder-controller 31. The carbon potential of the atmosphere in hot zone 14 may be sensed in a known manner such as by passing a sample of such atmosphere through conduit 36 to carbon potential detector 37 which in turn is effective to generate an electrical signal representative of such carbon potential and supply the same to recorder-controller 31. It will be appreciated that carbon potential detector 37 may take the form of a "hot wire," the resistance of which varies as a function of the carbon potential of the sample of the furnace atmosphere withdrawn from hot zone 14. Alternately, an oxygen probe, dewpoint sensor or infrared monitor or other suitable device may be utilized to provide an electrical representation of the carbon potential in hot zone 14. Recorder-controller 31 is effective in known manner to supply output signals over lines 32 and 33 which in turn are effective to control the setting or opening of solenoid valves 24 and operation of pump 28, respectively, thereby enabling an automatic control over the supply of the gaseous carbon source and water. Carbonitriding of parts 16 may be effected by supplying controlled flows of ammonia from source 40 through valve 41 and conduit 42 to hot zone 14.

The method according to the present invention will now be described. Initially, ferrous parts 16 are loaded into the hot zone 14 of furnace 10 by passing such parts through doors 13 and 15 provided at either side of vestibule 12 or, a door (not shown) which may be provided at the right side of hot zone 14. During the heating of hot zone 14 to carburizing temperatures of at least 1350° F. and preferably between 1650–1800° F., nitrogen or other inert gas is passed from supply 17 through conduit 18 and valve 19 into vestibule 12. Preferably, such inert gas is supplied at a flow rate of less than 50% of the flow rate of carrier gases such as endothermic or exothermic gas recommended for such a furnace. Typically, nitrogen may be supplied to vestibule 12 at a flow rate of 20–30% of the recommended carrier gas flow rate except during rapid quenching and opening of doors 13 and 15 when higher temporary flow rates may be desirable to insure that the oxygen concentration in vestibule 12 is below levels at which combustion can be supported (5% or less). During the heating of hot zone 14 to carburizing temperatures, the supply of inert gas into vestibule 12 has the effect of introducing nitrogen into the hot zone 14. This flow or diffusion of nitrogen (which is considerably drier than ambient air) is effective to reduce the moisture content of the atmosphere in zone 14, typically to a dewpoint of 0° or less and preferably to a dewpoint of −20° F. or so. Thus, a very dry atmosphere will exist in zone 14 such that subsequent water additions, which enable the production of atmospheric reactions favorable to carburizing, do not raise the dewpoint to levels so as to render the resulting atmosphere decarburizing. During the heating of zone 14, inert gas such as nitrogen may be introduced therein through conduit 20 and valve 21 to purge this zone, particularly when oily parts are to be carburized. Upon the hot zone 14 reaching a desired temperature, valve 21 is closed while inert gas continues to flow through conduit 18 and valve 19 into vestibule 12. Typically, inert gas may be inroduced into vestibule 12 during carburizing of parts 16 at a flow rate of 40–60 CFH.

Upon hot zone 14 reaching a desired carburizing temperature of, for example, 1650°–1800° F., flows of carbonaceous gas from source 23 and water from source 27 are commenced. A small amount of water may be introduced into hot zone 14 prior to reaching this temperature range in order to clean oily parts thereby rendering the surface of such parts more receptive to carbon. Reaction between such water and carbonaceous compounds of this surface oil, etc. will not impair the establishment of a dry, inert atmosphere in zone 14 prior to introduction of a gaseous carbon source through conduit 25. The gaseous carbon source is caused to flow at a rate of typically 20–40 CFH depending upon the size of hot zone 14. Water is passed through pump 28 and conduit 29 at the rate of about 0.1–15 ml/min. The particular water flow rate will be determined by factors, such as the condition of the furnace (i.e. leaky or tight), and whether alloy or ceramic tube heaters are utilized, etc. It will be understood that as excessive flows of water to zone 14 will tend to be decarburizing and tend to reduce the carbon potential of the atmosphere therein, recorder/controller 31 which is effective to maintain a set carbon potential may be utilized to control the rate of water additions to hot zone 14.

The water introduced through valve 29 into zone 14 is preferably mixed with the gaseous carbon source prior to introduction into hot zone 14 wherein the water is vaporized and reacts with the gaseous carbon source, typically methane, in the following water-gas reaction:

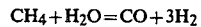

The precise flow rates of the gaseous carbon source and water are established under the control of recorder-controller 31 and, by setting a desired carbon potential on such recorder-controller, valve 24 and pump 28 may be adjusted to the correct setting. The actual carbon potential within hot zone 14 is sensed by means of detector 37 which is effective to pass an electrical signal over line 38 as control signals which are supplied over lines 32 and 33 to valve 24 and pump 28.

In the course of carburizing parts 16 in hot zone 14 by the method according to the invention, a carburizing atmosphere of the following approxiamte composition will be established:
$H_2 = 40–50\%$
$N_2 = 35–40\%$
$CO = 15–20\%$
$CO_2 = 0.15\%$ or less
$CH_4$ (unreacted) $= 2–5\%$
$H_2O$ = dewpoint of $+20°$ F. or less The addition of water to methane introduced into the hot zone of a carburizing furnace in the absence of a carrier gas is considered to produce several important effects which enable desired carburization of parts 16. The flow of water into zone 14 results in its vaporization which occurs with a large volume change and as a gas, it acts to exclude atmospheric air from leaking into zone 14 as well as tending to impede the flow and/or diffusion of nitrogen from vestibule 12 into the hot zone. Thus, by tending to reduce the influx of nitrogen into hot zone 14, vaporized moisture assists in preventing the establishment of a "sluggish" atmosphere and permits the above reaction between water and methane to proceed actively. The primary consequences of this reaction is that hydrogen levels of 40% and desired CO levels on the order of 14% or greater will occur in hot zone 14 and thereby enable the formation of free carbon by the following reaction:

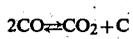

This formation of free carbon is desired in that it is believed that such carbon is readily transferred to the workpiece as opposed to the decomposition of methane into carbon and hydrogen which tends to develop sooting conditions in a furnace. The water introduced into hot zone 14 is fully (100%) reactive with methane and is thus a superior oxidant than is air (which is 79% nitrogen) or $CO_2$. The reason for this superiority is believed to be that the above water/gas reaction is dominant and occurs before methane can decompose into carbon and consequently, less sooting occurs. Carbon dioxide tends to be a powerful decarburizing agent and is not as reactive as such with methane. Also $CO_2$ prefers to react with surface carbon rather than $CH_4$. Consequently, the use of water results in a greater production of hydrogen and CO in hot zone 14 and by virtue of its vaporization tends to exclude nitrogen and ambient air from this zone thereby preserving reactive atmospheres so that the kinetics of desirable carburizing reactions are not compromised. Consequently, the addition of water to carburizing atmospheres which do not rely on carrier gases is important in that the plural foregoing benefits are obtainable in a relatively simple manner by mixing water with the gaseous carbon source, i.e. methane or adding water at a predetermined rate into hot zone 14.

As those skilled in the art will appreciate, water, air and carbon dioxide are generally considered to be strong oxidants and decarburizing agents. However, in order for carburizing reactions to proceed effectively, an oxidant is required to react with methane for the production of CO. The particular importance of water in this regard is that by initially establishing a low dewpoint in hot zone 14, such as by introducing inert gas such as nitrogen into vestibule 12 and/or purging hot zone 14 with dry, inert nitrogen gas, the dewpoint thereof will be reduced to a sufficiently low level of 0° F. or less such that the subsequent addition of water which has the aforementioned beneficial effects in promoting carburizing reactions will not result in a moisture concentration in zone 14 of such a level that will tend to decarburize parts 16. Consequently, although the addition of water may raise the dewpoint of hot zone 14 from for example −20° F. to about +30° F. (the dewpoint of endothermic gas) the main water/gas reaction will continue to be dominant and proceed to produce $H_2$ and CO and yet the effect of such water will not decarburize parts 16. On the contrary, desired carbon potentials of up to 1.4 or so may be readily maintained in hot zone 14. An additional benefit from the use of water additions to hot zone 14 in accordance with the present invention is that carbon potential detector 37 may take any of several forms and, for example, may comprise a dewpoint monitor, infrared monitor, oxygen probe or a "hot wire" resistance detector as mentioned above. Those skilled in the art will recognize that by providing a choice of carbon potential detector devices, the most economical device suitable to a given furnace may then be utilized thereby improving the overall process economics.

Although carburization of ferrous parts is effective to increase surface hardness, it is frequently necessary to subject certain parts to subsequent heat treating operations, such as bright hardening or annealing to improve the surface appearance. In both of these latter operations, surface carbon remains unchanged although surface oxides are reduced to develop a brighter finish to the part. In annealing, the part is subjected to a reducing atmosphere and then to a slow, atmosphere cooling while in bright hardening, the parts are retained under a reducing atmosphere and are quenched rapidly. It has not been previously possible to effect such bright hardening and/or annealing operations in the same integral quench vestibule furnace in which such parts have been carburized by an endothermic carrier gas based process. The reason for this is that as endothermic gas is generated from a particular ratio of natural gas and air, it is difficult, if not impossible, to alter such ratios to produce a resulting gas composition comprised of at least 60% hydrogen. Consequently, ferrous parts heretofore carburized in vestibule or integral quench furnaces under endothermic based atmospheres had to be removed from such furnaces and bright hardened or annealed in other furnaces.

In accordance with one aspect of the present invention, ferrous parts which are carburized in hot zone 14 of furnace 12 may be brightened or reduced therein by simply maintaining or reducing the flow of carbonaceous gas thereto while increasing the flow of water by about 20% to 100% of the flow used during carburizing. At the lower end of the range of water flow during carburizing (e.g. 0.1–3.0 ml/min) the subsequent increase may be about 100% while at higher flows, the increase may be about 20% or so. In this manner an atmosphere in hot zone 14 comprised of at least 60% hydrogen will be formed while sufficient carbonaceous gas will be supplied to this zone so that the surface carbon content of parts 16 is not diminished. The temperature of zone 14 during such annealing may be maintained at say 1700° F. (the carburizing temperature) or decreased to say 1550° F. In order to effect the final desired physical properties of parts carburized in hot zone 14, such parts may be passed to vestibule 12 and subjected to a slow atmosphere quench (annealing) or subjected to a rapid quench, typically in an oil bath 9 located therebelow thereby hardening the parts. However, in the event hot zone dewpoint increases beyond accepted levels (the atmosphere becomes decarburizing) upon commencement of increased water flows, the flow of carbonaceous gas may be increased by the operation of recorder/controller 31 to establish a neutral but reducing atmosphere in the hot zone 14. Consequently, not only does the present invention provide an improved process for carburizing ferrous parts without the use of a carrier gas but also enables subsequent heat treatment operations such as bright hardening and annealing to be readily conducted in the same integral quench or vestibule type furnace.

It will be understood that in addition to carburizing parts in a batch type furnace illustrated in the drawing, ferrous parts may also be carburized and bright hardened or annealed in a continuous furnace. In the latter type of furnace, inert gas is supplied to entrance and exit vestibules as depicted in U.S. Pat. No. 4,049,473 while a gaseous carbon source and water are supplied to the hot zone as previously described.

The foregoing and other various changes in form and details may be made without departing from the spirit and scope of the present invention. Consequently, it is intended that the appended claims be interpreted as including all such changes and modifications.

What is claimed is:

1. A method of carburizing ferrous parts in an integral quench furnace having one or more vestibules and a hot zone comprising the steps of:
   heating the hot zone to a temperature of 1350° F. or greater;
   introducing a flow of nitrogen gas to each such vestibule at a flow rate sufficient to maintain oxygen levels therein below levels required to support combustion;
   reducing the dewpoint of the hot zone to less than 0° F. during heating thereof to said temperature of at least 1350° F.;
   supplying water at a flow rate of about 0.1–15 ml/min and a gaseous carbon source without a carrier gas to said hot zone to form an atmosphere therein comprised of up to about 40% nitrogen, at least 14% carbon monoxide and 40% hydrogen and in which said parts are carburized.

2. The method defined in claim 1 wherein said step of supplying water and a gaseous carbon source comprises premixing said water and gaseous carbon source exteriorly of said hot zone and introducing said mixture into the hot zone of said furnace.

3. The method defined in claim 1 additionally comprising the steps of sensing the carbon potential of the atmosphere in said hot zone and controlling the flow rates of water and gaseous carbon source to maintain a predetermined carbon potential in said hot zone.

4. The method defined in claim 1 additionally comprising the step of supplying ammonia to said hot zone whereby said parts are carbonitrided.

5. The method defined in claim 1 wherein the step of introducing nitrogen into each vestibule comprises supplying nitrogen gas to each such vestibule at a flow rate less than 50% of the recommended carrier gas flow rate for said furnace whereby the oxygen levels in each such vestibule are maintained below levels required to support combustion.

6. The method defined in claim 1 additionally comprising the steps of increasing the flow rate of said water by approximately 20 to 100% after said parts have been carburized in said hot zone for a predetermined period of time; controlling the flow of said gaseous carbon source to avoid decarburization of said parts and to establish an atmosphere in said hot zone comprised of at least 60% hydrogen such that surface oxides of said parts are reduced in said hot zone.

7. The method defined in claim 6 additionally comprising the steps of passing said parts from said hot zone after said parts have been exposed to said atmosphere containing at least 60% hydrogen and rapidly quenching said parts in an oil bath.

8. The method defined in claim 1 additionally comprising the steps of reducing the temperature of said hot zone and flow rate of said gaseous carbon source to said hot zone and increasing the flow rate of water to said hot zone to establish an atmosphere therein comprised of at least 60% $H_2$ such that surface oxides of said parts are reduced in said hot zone.

9. The method defined in claim 3 wherein said step of sensing the carbon potential of the atmosphere of said hot zone comprises withdrawing a sample of said atmosphere and passing said withdrawn sample into contact with a wire the resistance of which varies as a function of the carbon potential of said withdrawn sample.

10. The method defined in claim 3 wherein the step of sensing the carbon potential of the atmosphere of said hot zone comprises sensing the dewpoint of said atmosphere and producing an electrical signal which varies as a function of said sensed dewpoint.

* * * * *